(12) United States Patent
Fischer et al.

(10) Patent No.: US 11,468,057 B2
(45) Date of Patent: Oct. 11, 2022

(54) METHOD AND SYSTEM FOR PROVIDING A GENERIC QUERY INTERFACE

(71) Applicants: Jan-Gregor Fischer, Zorneding (DE); Michael Watzke, Munich (DE); Michael Pirker, Lenggries (DE)

(72) Inventors: Jan-Gregor Fischer, Zorneding (DE); Michael Watzke, Munich (DE); Michael Pirker, Lenggries (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/051,769

(22) PCT Filed: Apr. 16, 2019

(86) PCT No.: PCT/EP2019/059723
§ 371 (c)(1),
(2) Date: Oct. 29, 2020

(87) PCT Pub. No.: WO2019/211090
PCT Pub. Date: Nov. 7, 2019

(65) Prior Publication Data
US 2021/0240707 A1    Aug. 5, 2021

(30) Foreign Application Priority Data

Apr. 30, 2018  (EP) .................................. 18170062

(51) Int. Cl.
*G06F 16/2453* (2019.01)
*G06F 16/248* (2019.01)
(Continued)

(52) U.S. Cl.
CPC ...... *G06F 16/24534* (2019.01); *G06F 16/248* (2019.01); *G06F 16/252* (2019.01); *G06F 40/237* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 2011/0319714 A1* | 12/2011 | Roelle | A61B 1/0016 600/118 |
| 2015/0154177 A1* | 6/2015 | Allen | G06F 40/169 704/9 |

(Continued)

FOREIGN PATENT DOCUMENTS

GB    2459354 A    10/2009

OTHER PUBLICATIONS

European Search Report for European Application No. 18170062. 6-1217 dated Jul. 26, 2018.

(Continued)

*Primary Examiner* — Kim T Nguyen
(74) *Attorney, Agent, or Firm* — Lempia Summerfield Katz LLC (57) ABSTRACT

A system for providing a generic query interface for industrial systems of different customers includes an interface configured to input customer queries of customer industrial systems. The system also includes a query processing unit that is configured to automatically perform a query decomposition of the input customer query into query parts based on a query reformulation model stored in a database of the system. For each decomposed query part, it is determined whether the decomposed query part is available in an application semantic model stored in the database of the system. Query parts not available in the application semantic model are automatically reformulated based on the query reformulation model, and a query recomposition of the query parts available in the application semantic model and the reformulated semantic query parts is automatically per- (Continued)

formed to generate a generic query applied to an application logic of the system to provide a query result.

15 Claims, 4 Drawing Sheets

(51) Int. Cl.
*G06F 16/25* (2019.01)
*G06F 40/237* (2020.01)
*G06F 40/30* (2020.01)

(56) References Cited

U.S. PATENT DOCUMENTS

| | | | |
|---|---|---|---|
| 2019/0057077 A1* | 2/2019 | Boguraev | G06F 40/284 |
| 2019/0057078 A1* | 2/2019 | Boguraev | G06F 40/284 |
| 2019/0147412 A1* | 5/2019 | Chiaramonte | G06Q 10/20 |
| | | | 705/7.13 |
| 2019/0287032 A1* | 9/2019 | Seabolt | G06F 16/215 |
| 2021/0240707 A1* | 8/2021 | Fischer | G06F 40/237 |

OTHER PUBLICATIONS

Liao, Chun-Feng, Kung Chen, and Jiu-Jye Chen. "Toward a tenant-aware query rewriting engine for Universal Table schema-mapping." 4th IEEE International Conference on Cloud Computing Technology and Science Proceedings. IEEE, 2012. pp. 833-838.
PCT International Search Report and Written Opinion of International Searching Authority dated Jun. 3, 2019 corresponding to PCT International Application No. PCT/EP2019/059723.

\* cited by examiner

METHOD AND SYSTEM FOR PROVIDING A GENERIC QUERY INTERFACE

This application is the National Stage of International Application No. PCT/EP2019/059723, filed Apr. 16, 2019, which claims the benefit of European Patent Application No. EP 18170062.6, filed Apr. 30, 2018. The entire contents of these documents are hereby incorporated herein by reference.

BACKGROUND

The present embodiments relate to providing a generic query interface for industrial systems of different customers.

Figure 1:
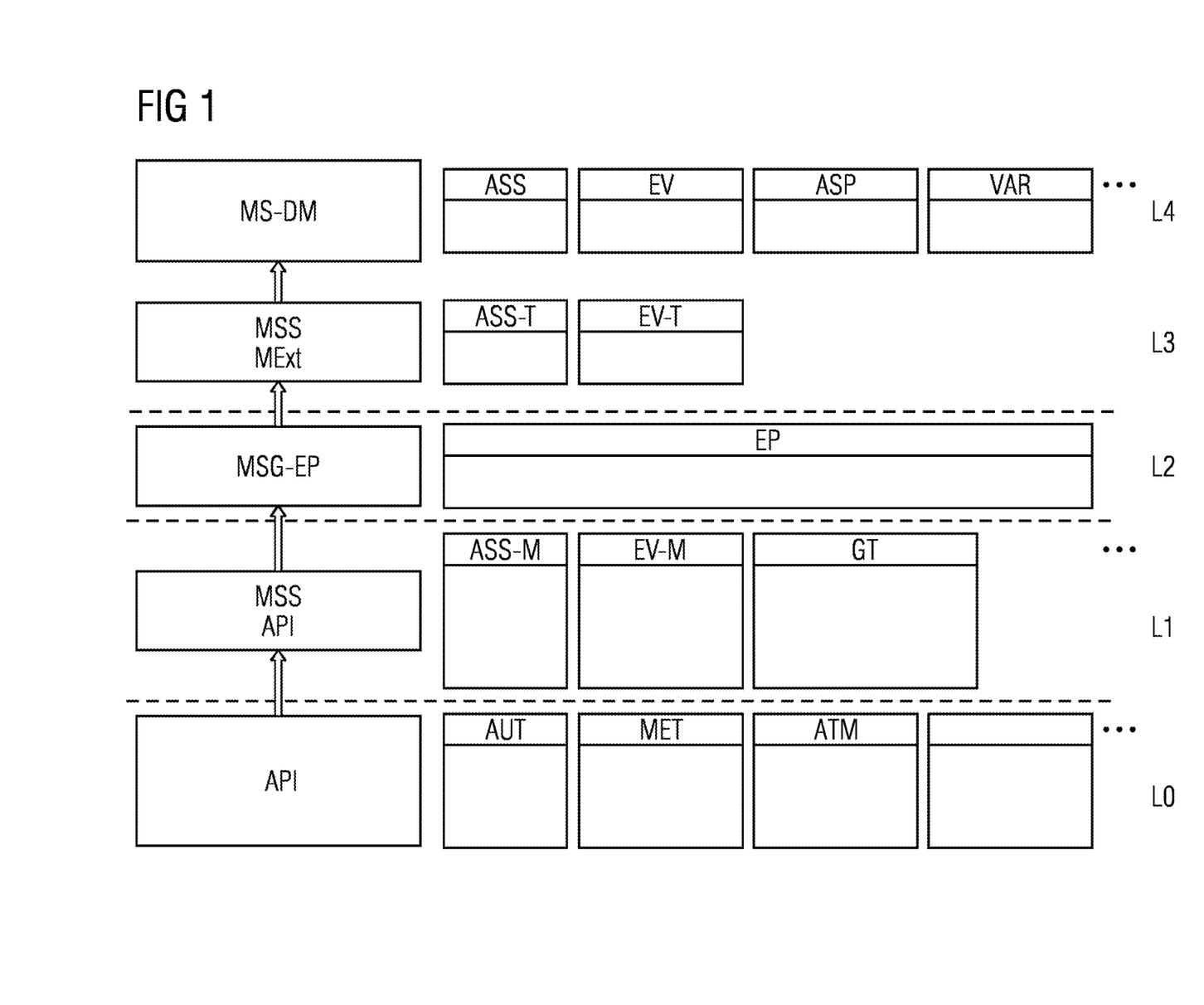
FIG. 1 shows a diagram for illustrating the general structure of a conventional multi-layered interface.

Current technical software systems used for information retrieval and filtering are often designed in a layered structure as illustrated in FIG. 1. FIG. 1 shows a conventional multi-layered interface design of a software system. At the lowest layer L0 of the multi-layered interface design, there is a customer layer including customer specific APIs of costumers or OEMs. Often, specific interface features are required for different customers or technical domains. These technical domains may, for example, include an automotive domain AUT, a metal processing domain MET, an automation domain ATM, or any other kinds of technical domains. Each technical domain may include one or more API for different customers or OEM, as illustrated in the diagram of FIG. 1.

The next layer L1 of the multi-layered interface has available interface features of a data cloud backend software MSS that may be visible towards the customer interface designers offering different kinds of functionality that may help to realize the customer interface itself. The functionality offered in layer L1 may include asset manipulation ASS-M, including creation, modification, deletion, or retrieval of assets. Further, the offered functionality may include event manipulation EV-M such as creation, modification, deletion, or retrieval of events. A graph traversal functionality GT may include get asset parts, get asset subclasses, get event subclasses, or get related elements.

The next layer L2 of the multi-layered interface illustrated in FIG. 1 includes a generic interface (e.g., a data cloud backend generic SPARQL endpoint MSG EP). This generic interface of layer L2 offers a highly versatile query interface based on a query language. The query language may be, for example, a contemporary database language like SQL or a more advanced semantic query language like SPARQL. The layer L2 itself operates on a specific data model such as a database model or a semantic model.

If a user triggers a query on the customer layer L0, the interface logic may access information from the data cloud backend system (e.g., a mind sphere system) by calling interface routines from the next layer up (e.g., an asset manipulation method call). The interface logic then itself calls the SPARQL endpoint with a SPARQL query for asset manipulation. The SPARQL query may operate on the semantic model of a web sphere application. Layer L3 may include a data cloud backend Semantics Model Extension MSSM Ext. Layer L4 may include a data cloud backend Data model (with REST based API).

Different layers L of the multi-layered interface may decouple the high versatile generic query interface (e.g., SPARQL endpoint) from the end user (e.g., OEM). The generic interface of layer L2 does offer, for different customers, different interfaces by adhering or using the same data model.

The creation of different interface layers L induces a higher development effort for each customer. A possible way of interface design is to expose the end user such as the OEM to an interface as close as possible to the data model (e.g., SPARQL endpoint). However, a major problem in doing this is that an end user that should use a generic query interface (e.g., SPARQL endpoint) is to have an intimate knowledge of the data model because without this knowledge it is not possible for the user to formulate the queries.

Without knowing that the model contains assets, the user is not capable to retrieve information about the assets. If a user is accustomed to the term devices (e.g., which may be assets in the data cloud backend), either a customer specific user interface or a customer training is to be provided.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and a system for providing a generic query interface for industrial systems of different customers, where customers may interact with this interface without or with less specific knowledge of the underlying industrial system, are provided.

According to a first aspect, a method for providing a generic query interface for industrial systems of customers is provided. The method includes performing a query decomposition of a customer query input by an application query interface of a customer industrial system into query parts based on a stored query reformulation model. It is determined whether the decomposed query parts of the received customer query are available in a stored application semantic model. Query parts that are not available in the application semantic model are reformulated based on the query reformulation model, and a query recomposition of the query parts available in the application semantic model and the reformulated query parts is performed to generate a generic query applied to an application logic to provide a query result.

In a possible embodiment of the method according to the first aspect, the stored query reformulation model includes mappings for terms of model elements between customer specific terms and application semantic model terms of the application semantic model and transformation rules used for translating model terms.

In a further possible embodiment of the method according to the first aspect, the stored application semantic model includes an ontological model.

In a still further possible embodiment of the method according to the first aspect, the mapping for terms of model elements includes mappings between data source terms, mappings between event source terms, and mappings between other information terms.

In a still further possible embodiment of the method according to the first aspect, the generated generic query is transmitted via a local and/or global network to the application logic that processes the received generic query based on a generic data model of the industrial system to calculate a generic query result.

In a still further embodiment of the method according to the first aspect, the calculated generic query result is reformulated into a customer specific query result based on the stored query reformulation model and output by the application query interface of the customer industrial system.

The present embodiments provide, according to the second aspect, a query processing system for providing a generic query interface for industrial systems of different customers. The query processing system includes at least one application query interface adapted to input customer queries of customer industrial systems, and a query processing unit. The query processing unit is configured to automatically perform a query decomposition of the input customer query into query parts based on a query reformulation model stored in a database of the query processing system. For each decomposed query part, it is determined by the query processing unit whether the decomposed query part is available in an application semantic model stored in the database of the query processing system. The query processing unit is further configured to automatically reformulate query parts not available in the application semantic model based on the query formulation model, and to automatically perform a query recomposition of the query parts available in the application semantic model and the reformulated semantic query parts to generate a generic query applied to an application logic of the query processing system to provide a query result output by the application query interface.

In a still further possible embodiment of the query processing system according to the second aspect, the stored query reformulation model includes mappings for terms of model elements between customer specific terms and application semantic model terms of the application semantic model, as well as transformation rules used for translating model terms.

In a possible embodiment of the query processing system according to the second aspect, the stored application semantic model includes an ontological model.

In a still further possible embodiment of the query processing system according to the second aspect, the mappings for terms of model elements include mappings between data source terms, mappings between event source terms, and mappings between other information terms.

In a further possible embodiment of the query processing system according to the second aspect, the generated generic query is transmitted via a local or global network to the application logic that is adapted to process the received generic query based on a stored generic data model of the industrial system to calculate a generic query result.

In a further possible embodiment of the query processing system according to the second aspect, the calculated generic query result is reformulated by the query processing unit into a customer specific query result based on the stored query reformulation model, where the customer specific query result is output by the application query interface of the customer industrial system.

In a further possible embodiment of the query processing system according to the second aspect, the query processing unit includes a local query processing unit or a remote query processing unit implemented on a server of a service provider.

In a still further possible embodiment of the query processing system according to the second aspect, the query reformulation model is decentralized.

In a still further possible alternative embodiment of the query processing system according to the second aspect, the query reformulation model is stored in a central database of a service provider.

In a further possible embodiment of the query processing system according to the second aspect, the application query interface includes a user interface to receive a customer query input by a user of the industrial system.

In a still further possible embodiment of the query processing system according to the second aspect, the application query interface includes a data interface to receive a customer query generated by a controller of the industrial system.

DETAILED DESCRIPTION

Figure 2:
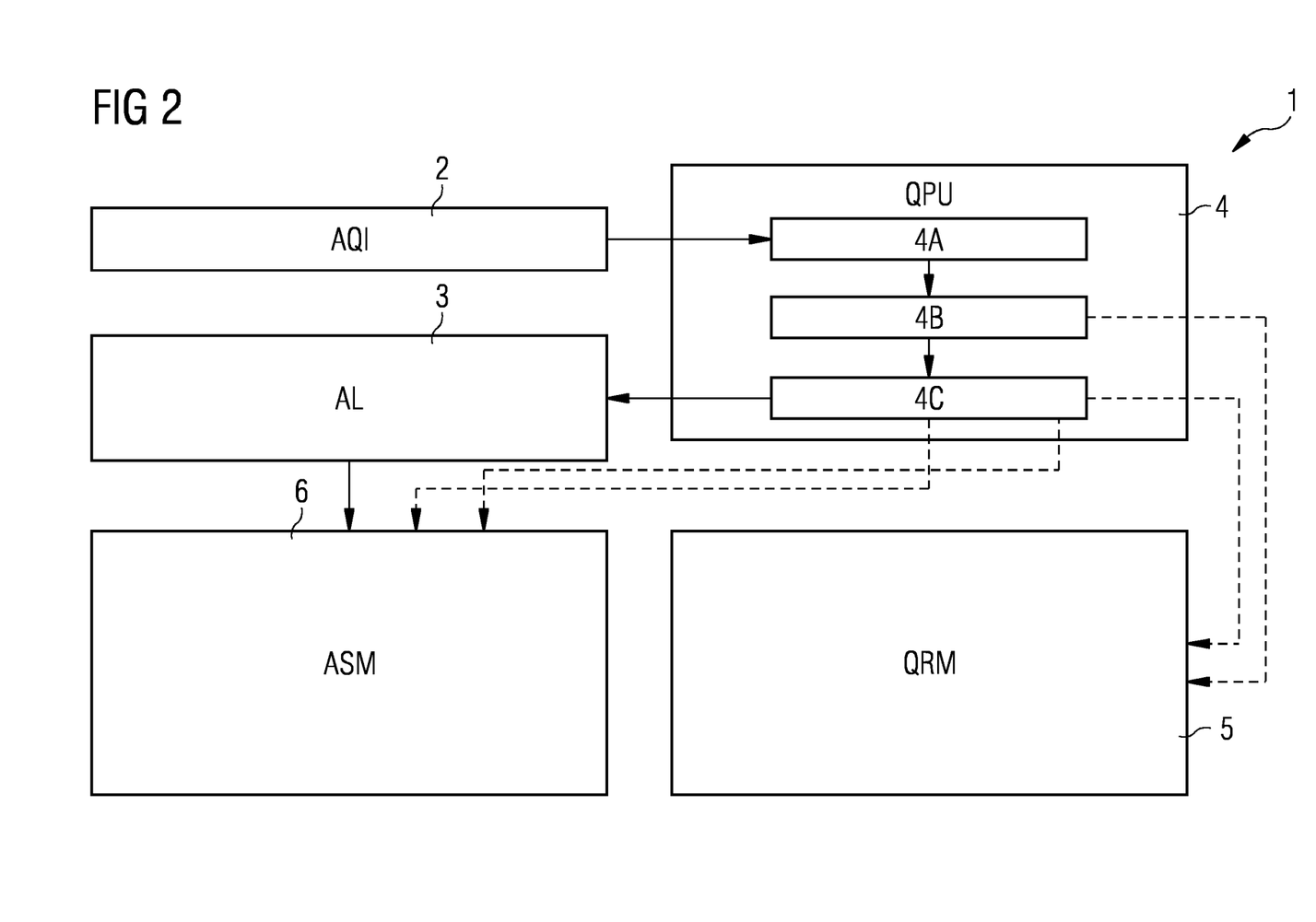
FIG. 2 shows a schematic diagram for illustrating a possible exemplary embodiment of a method and a system.

FIG. 2 shows schematically a possible exemplary embodiment of a query processing system (QPS) 1 according to an embodiment. The query processing system 1 as illustrated in FIG. 2 may be used to provide a generic query interface for industrial systems of different customers. The customers may be, for example, manufacturing companies operating in a same technical domain. For example, the customers may be different automotive companies using similar manufacturing processes to produce vehicles. As illustrated in the schematic block diagram of FIG. 2, the query processing system 1 according to the present embodiments includes at least one application query interface (AQI) 2 adapted to input customer queries Q of customer industrial systems such as manufacturing facilities. An end user of the customer or manufacturing company may access an application executed by a processing entity via an application user interface that may include some kind of application query interface AQI, as illustrated in the schematic diagram of FIG. 2. The application query interface 2 may allow monitoring, diagnosis, or information retrieval. The application query interface AQI 2 may form a front end of an application logic 3 of the software system illustrated in FIG. 2. One part of the application logic 3 is formed by a query endpoint to a database storing an application semantic data model (ASM). Based on these components of the system, user queries Q may be processed and answered. The application query interface AQI may, in a possible embodiment, also be multi-layered.

The query processing system 1 illustrated in FIG. 2 includes a query processing unit (QPU) 4 that is configured to automatically perform a query decomposition of the input customer query Q into query parts based on a query reformulation model QRM stored in a database 5 of the query processing system 1, as shown in FIG. 2. For each decomposed query part QP, it may be determined by the query processing unit 4 whether the decomposed query part is available in an application semantic model ASM stored in the database 6 of the query processing system 1. The application semantic model ASM includes a semantic description of an application including data sources, system events, and additional information such as diagnosis cases etc. The query processing unit 4 is further configured to reformulate automatically query parts QP not available in the application semantic model ASM based on the query reformulation model QRM and to perform automatically a query recomposition of the query parts QP available in the application semantic model ASM and the reformulated semantic query parts QP to generate a generic query. The generated generic query is then applied by the query processing unit 4 to the application logic 3 of the query processing system 1 to provide a query result. The query result is output by the application query interface 2 to a user of the industrial system.

The query reformulation model QRM stored in the database 5 may include, in a possible embodiment, mappings for terms of model elements between customer specific terms and application semantic model terms of the application semantic model ASM, as well as transformation rules that may be used for translating model terms. In a possible embodiment, the application semantic model ASM stored in the database 6 may include an ontological model. The mappings for terms of model elements may include, for example, mappings between data source terms of data sources, mappings between event source terms of event sources, and mappings between other information terms.

The generated generic query gQ provided by the query processing unit 4 may, in a possible embodiment, be transmitted or supplied via a local and/or global network to the application logic 3. The application logic 3 of the system is adapted to process the received generic query gQ based on a stored generic data model of the industrial system to calculate a generic query result gQR. In a possible embodiment, the calculated generic query result gQR may be reformulated by the query processing unit 4 into a customer specific query result based on the stored query reformulation model QRM. The customer specific query result is then output by the application query interface AQI of the industrial system of the customer. In a possible embodiment, the query processing unit 4 of the query processing system may include a local query processing unit on the site of the customer industrial system. In an alternative embodiment, the query processing unit 4 of the query processing system 1 may include a remote query processing unit implemented on a remote server of a service provider. Further, the query reformulation model QRM may be stored in a possible implementation in a decentralized manner at different sites (e.g., at the sites of the industrial systems). Further, the query reformulation model QRM may also be stored in an alternative embodiment in a central database of a service provider.

The application query interface (AQI) 2 of the query processing system 1 may include a user interface to receive a customer query Q input by a user of the customer industrial system. The application query interface AQI 2 may further include a data interface to receive a customer query generated by a controller of the customer industrial system.

The query processing unit QPU 4 may include a query reformulation reasoner. The query reformulation reasoner may break up a direct link between the application query interface AQI and the application logic AL 3. A query entered into the application query interface AQI 2 of the system 1 may be intercepted in a possible embodiment by the query reformulation reasoner of the query processing unit 4 at once. In a possible embodiment, the query processing unit 4 may include a query decomposition module 4A that is adapted to decompose the received query Q into single terms. In a possible embodiment, the query decomposition module 4A may implement different methods including pattern matching as well as software compilation and decompilation methods.

The query processing unit 4 may, in a possible embodiment, include a query reasoning module 4B shown in the embodiment of FIG. 2. The query parts or query terms provided by the query decomposition module 4A may, in a possible embodiment, be compared to the application semantic model ASM stored in the database 6. Query parts that are not available in the application semantic model ASM are reformulated using the query reformulation model QRM stored in the database 5. The query processing unit 4 may include, in a possible embodiment, a query recomposition module 4C, as illustrated in the schematic diagram of FIG. 2, that is adapted to perform a query recomposition process where all query parts or query terms including those from the original application semantic model ASM and those created during the dynamic query reformulation process are recomposed into a single query. The query composition or query recomposition may be performed in a possible embodiment by pattern matching where query parts of the query Q are replaced by the matching parts of the query reformulation model QRM. The resulting dynamically generated query may be fed back into the standard application logic 3 where the generic query endpoint may now be called using the generated query. The system may process the reply to an answer using corresponding system inherent data model elements (e.g., end of forward direction processing).

The calculated query result QR may be dynamically reformulated for the calling user. Those parts of the query result QR that contain application semantic model elements that are unknown to the calling user may be reformulated in a possible embodiment by the query reformulation reasoning unit 4B based on the query reformulation model QRM stored in the database 5 into the original model terms that are known to the customer or user. In some cases, the reformulation is not required (e.g., in data retrieval, only the pure data, numbers, may be output to the user so that no query result reformulation is required). The query reformulation reasoning module 4B may include standard reasoning software components such as ontological reasoners (e.g., if ontological data models are chosen for the application semantic model ASM and the query reformulation model QRM).

The query reformulation model QRM stored in the database 5 of the system may include a collection of model elements and transformation rules that may be used in the process of query reformulation. During the query reasoning step, query parts that are not available in the application semantic model ASM are automatically reformulated using the stored query reformulation model QRM. The query reformulation model QRM may contain mappings for terms of model elements between a specific customer data term and corresponding application semantic model terms. Model elements that may need to be mapped (e.g., like: <application model> map to <customer model>) may include data source types (e.g., "SPS" mapped to "ASSET"), events (e.g., "high temperature" mapped to "temperature above 80 degree Celsius") and further information (e.g., "Rule (43) instance of diagnosis: exists convey or block create Instance (alert)" mapped to "diagnosis-rule 43: if conveyor block issue alert").

Additional supporting rules R for query reformulation may form part of the query reformulation model QRM stored in the database 5. These rules R may help in reformulation situations where mere term reformulation fails and more complex relationships between model elements within the customer model of the industrial system and the application semantic model ASM are to be considered. For example, under the specific condition X, a data source may be referred to a source A, but under another different condition Y, the same data source is to be considered source D. Translating the model term for this data source into another model term (e.g., from customer model term into the application semantic model term) requires a rule R such as: "if condition=X map A to App-sem-Model-U" and "if condition=Y then map D to App-sem-Model-U".

Accordingly, the query reformulation model QRM may provide a bridge between the application semantic model ASM (e.g., the application world) and the customer model (e.g., the end user world). Further, the query reformulation model QRM may contain parts (e.g., mappings, rules) that are customer specific and other parts that apply to a group of customers such as OEMs in the automotive domain. The query reformulation models QRMs and model parts may be maintained centralized or decentralized. Further, the query reformulation models may be reused and cross-checked with other models. Depending on the expressiveness of the query reformulation model, QRM consistency checks, versioning, model integration, etc. may be realized. The query processing system 1 may be implemented by an FPGA.

Figure 3:
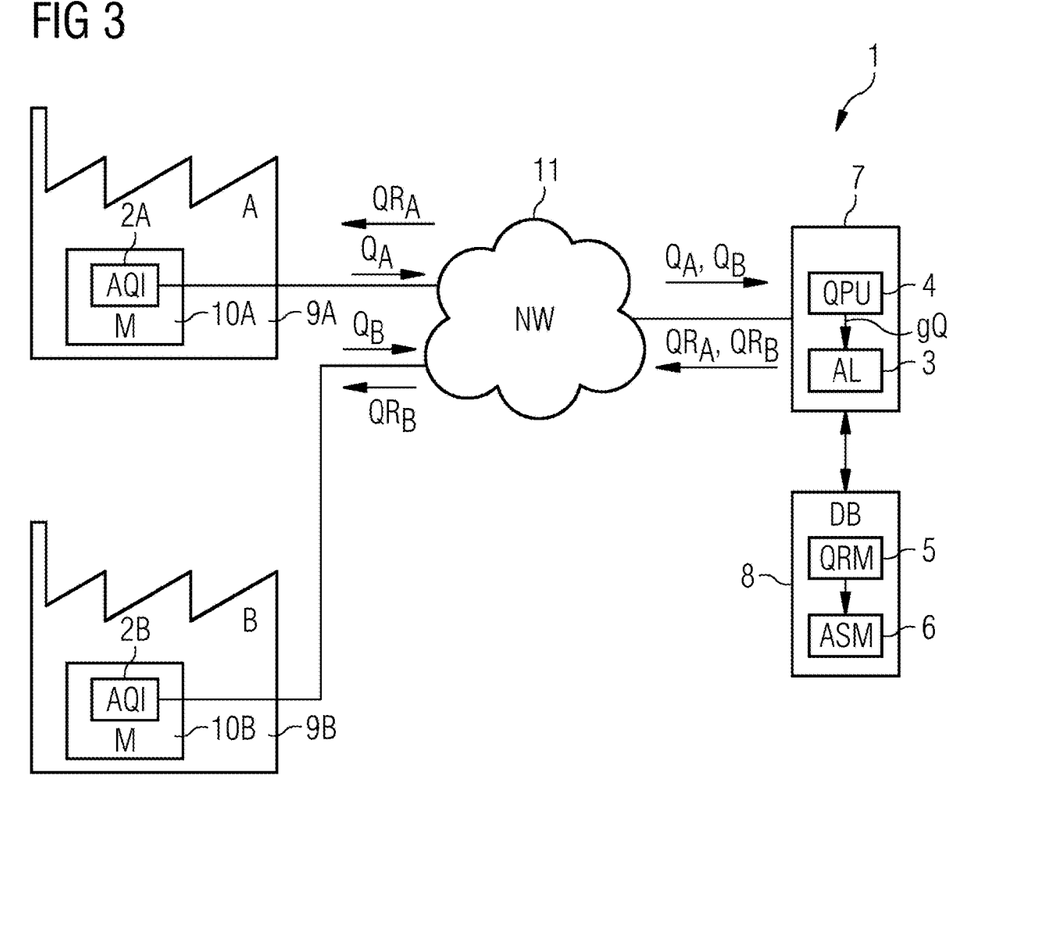
FIG. 3 shows a block diagram of a possible exemplary embodiment of a query processing system.

FIG. 3 shows a schematic block diagram of a possible exemplary embodiment of query processing system (QPS) 1. In the illustrated embodiment of FIG. 3, the query processing system 1 includes a query processing unit (QPU) 4 and an application logic (AL) 3 implemented on a server 7 of a service provider. The server 7 has access to a central database 8 including the query reformulation model QRM and the application semantic model ASM. In the illustrated embodiment of FIG. 3, two customers A, B operate an industrial system such as a manufacturing system 9A, 9B including one or several subsystems or machines 10A, 10B including application query interfaces (AQI) 2A, 2B, as shown in FIG. 3. The application query interfaces 2A, 2B may, for example, include user interfaces that receive a customer query input by a user such as a technician of the respective industrial system. The application query interfaces AQI 2A, 2B may also include a data interface to receive a customer query generated by a control unit or controller of the respective industrial system 9A, 9B. The application query interface AQI 2A, 2B is connected in the illustrated embodiment via a local or a global network 11 to the server 7 of the service provider. The customer queries Qa, Qb of the different customers A, B are supplied via the network 11 to the query processing unit 4 implemented on the server 7 of the service provider. The query processing unit 4 is adapted to automatically perform a query decomposition of the received customer queries Q into query parts based on the query reformulation model QRM stored in the memory 5 of the database 8, as shown in FIG. 3. For each decomposed query part QP, it may be determined by the query processing unit 4 of the server 7 whether the decomposed query part QP is available in the application semantic model ASM stored in the memory 6 of the database 8. The query processing unit 4 is configured to reformulate automatically query parts QP that are not available in the application semantic model ASM based on the query reformulation model QRM. Further, the query processing unit 4 may be adapted to automatically perform a query recomposition of the query parts QP available in the application semantic model ASM and the reformulated semantic query parts QP to generate a generic query gQ applied to the application model 3 implemented on the server 7 to provide a query result QR transmitted back to the respective application query interface 2A 2B, as shown in FIG. 3. The application query interface 2A, 2B may output the respective received query result QRa, QRb.

Figure 4:
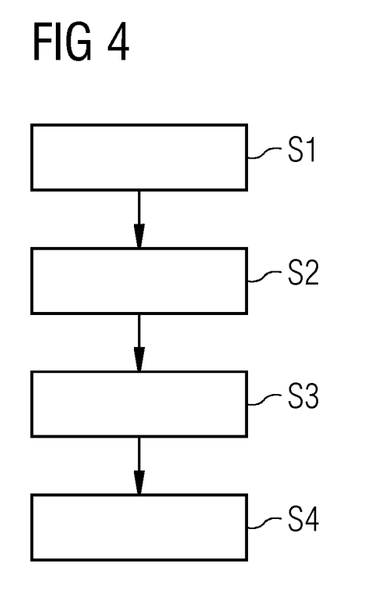
FIG. 4 shows a flowchart of a possible exemplary embodiment of a method for providing a generic query interface for industrial systems of customers.

FIG. 4 shows a flowchart of a possible exemplary embodiment of a method for providing a generic query interface for industrial systems of different customers. In the illustrated embodiment, the method includes a number of main acts. In a first act S1, a query decomposition of a customer query Q input by an application query interface AQI of a customer industrial system into query parts QP is performed based on a stored query reformulation model QRM.

In a further act S2, it is determined whether the decomposed query parts QP of the received customer query Q are available in a stored application semantic model ASM.

In a further act S3, query parts QP that are not available in the application semantic model ASM are reformulated automatically based on the stored query reformulation model QRM.

In a further act S4, a query composition of the query parts QP available in the application semantic model ASM and the reformulated query parts QP is performed to generate a generic query gQ that is supplied to an application logic AL to provide a query result QR.

In a possible embodiment, the generic query gQ generated in act S4 may be transmitted via a local or global network to the application logic AL that does process the received generic query gQ based on a generic data model of the respective industrial system to calculate a generic query result gQR. This generic query result may then be reformulated into a customer specific query result using the stored query reformulation model. The customer specific query result is then output by the application query interface AQI of the respective customer industrial system.

Operation of the method and system according to the present embodiments may be explained in more detail for the following example.

Within automotive company A (e.g., customer A) and within another automotive company B (e.g., customer B), similar processes do exist for producing a car. One part of this production process is lacquering the car. It may be assumed that similar production techniques and similar devices will be applied to lacquer a car in company A and company B. Yet, the concrete set-up of the production lines in these two companies are very likely to vary in a lot of details. Part of the lacquering is the actual application of color to metal pieces, performed by some sort of spraying device. In company A, this device is called "Spritzdüse," and in company B, this device is called "Lackierdüse". In addition, company A has placed the "Spritzdüse" in "Produktionslinie 32" and "Abschnitt 9", while in company B, the "Lackierdüse" device is physically located in "Band 4a" and there in "Modul 5".

Company A: "Produktionslinie 32"→"Abschnitt 9"→"Spritzdüse"

Company B: "Band 4a"→"Modul 5"→"Lackierdüse

The spraying device is a critical component, and therefore, outages are to be prevented. The spraying device has attached sensors that deliver sensor information (e.g., events) for further processing or information to human users. Therefore, the spraying device is a data source.

Company A:

"Produktionslinie 32"→"Abschnitt 9"→[data-source: "Spritzdüse", event: "verstopft"]

Company B:

"Band 4a"→"Modul 5"→[data-source: "Lackierdüse, event: "zugesetzt"]

Both companies get their lacquering lines from company C, which installed the original lines together with generic software. This software includes, besides other components, an application query interface AQI for use by employees of companies A and B, and a data model (e.g., application semantic model) defining the physical components of the lacquering production line.

In detail, one part of the model includes the following information:

Company C:

"Element 3A"→"Asset 4F"→[data-source: "Düse, event: "1"]

This provides that for the very same construction in companies A and B and for the original design of the producer of the lacquering line (e.g., company C), there are three different data models of the lacquering production lines (e.g., companies A, B, C).

An end user in company A or B, responsible for the functioning of the lacquering line, now normally accesses the application via an application user interface. This may include some kind of application query interface AQI in current industrial systems (e.g., allowing monitoring, diagnosis, information retrieval, etc.). This application query interface AQI is the frontend for the installed software system for the lacquering line where user queries Q may be processed and answered.

Query in company A: "Produktionslinie 32, Abschnitt 9, Spritzdüse verstopft?

Query in company B: "Band 4a, Modul 5, Lackierdüse zugesetzt?"

Within company A, for example, the query reformulation reasoner now gets the query "Produktionslinie 32, Abschnitt 9, Spritzdüse verstopft?". The Reasoner decomposes the query into the parts (e.g., based on an internal query reformulation model):

"Produktionslinie 32"==Element 3A

"Abschnitt 9"==Asset 4F

"Spritzdüse verstopft"==Düse: 1

After this, the reasoner may reason about the decomposed query (e.g., are all required parts of the query available, are the replaced parts correct, and so on) and compose the final query:

"Element 3A, Asset 4F, Düse 1?

This question may now be processed by the software originally delivered by Company C, when the lacquering line was installed.

For Company B, the reformulation reasoning is:

"Band 4a"==Element 3A

"Modul 5"==Asset 4F

"Lackierdüse zugesetzt"==Düse: 1

Once again, this results in the reformulated query for the lacquering line:

"Element 3A, Asset 4F, Düse 1?"

The mappings, for example, from "Produktionslinie 32" to "Element 3A", or from "Band 4a"=="Element 3A" are generated by the Query Reformulation Reasoner based on information held in the Query Reformulation Model QRM, for example:

"if Company==A then map "Produktionslinie 32" to "Element 3A"

"if Company==B then map "Band 4a" to "Element 3A"

The query "Element 3A, Asset 4F, Düse 1?" is now fed back into the standard application logic AL3: The generic query endpoint may now be called using the generated query. The system is processing the answer using a corresponding system inherent data model. In the reverse way, the query result may now be transported back to the calling user.

For example, "Element 3A, Asset 4F, Düse 1?" is TRUE. Then, the user gets in

Company A: "Spritzdüse verstopft"

Company B: "Lackierdüse zugesetzt"

as query result QR, and output of the diagnosis system.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing a generic query interface for industrial systems of customers, the method comprising:

performing a query decomposition of a customer query input by an application query interface of a customer industrial system into query parts based on a stored query reformulation model;

determining whether the decomposed query parts of the received customer query are available in a stored application semantic model;

reformulating query parts that are not available in the stored application semantic model based on the query reformulation model; and generating a generic query applied to an application logic, such that a query result is provided, generating the generic query comprising performing a query recomposition of the query parts available on the stored application semantic model and the reformulated query parts.

2. The method of claim 1, wherein the stored query reformulation model comprises mappings for terms of model elements between customer specific terms and application semantic model terms of the application semantic model, and transformation rules used for translating model terms.

3. The method of claim 2, wherein mapping for terms of model elements comprise mappings between data source terms, mappings between event source terms, and mappings between other information terms.

4. The method of claim 1, wherein the stored application semantic model comprises an ontological model.

5. The method of claim 1, further comprising transmitting the generated generic query via a local network or a global network to the application logic, which processes the received generic query based on a generic data model of the industrial system to calculate a generic query result.

6. The method of claim 5, further comprising:

reformulating the generic query result into a customer specific query result based on the stored query reformulation model; and outputting, by the application query interface of the customer industrial system, the customer specific query result.

7. A query processing system for providing a generic query interface for industrial systems of different customers, the query processing system comprising:

an application query interface configured to input customer queries of customer industrial systems; and a query processing unit configured to:

automatically perform a query decomposition of an input customer query into query parts based on a query reformulation model stored in a database of the query processing system, determine, for each of the decomposed query parts, whether the respective decomposed query part is available in an application semantic model stored in the database of the query processing system;

automatically reformulate query parts not available in the application semantic model based on the query reformulation model; and generate a generic query applied to an application logic of the query processing system, such that a query result is output by the application query interface, the generation of the generic query comprising automatic performance of a query recomposition of the query parts available in the application semantic model and the reformulated semantic query parts.

8. The query processing system of claim 7, wherein the stored query reformulation model comprises mappings for terms of model elements between customer specific terms and application semantic model terms of the application semantic model, and transformation rules used for translating model terms.

9. The query processing system of claim 8, wherein the mappings for terms of model elements comprise mappings between data source terms, mappings between event source terms, and mappings between other information terms.

10. The query processing system of claim 7, wherein the stored application semantic model comprises an ontological model.

11. The query processing system of claim 7, wherein the query processing unit is further configured to transmit the generated generic query via a local network or a global network to the application logic, which is configured to process the received generic query based on a stored generic data model of the industrial system to calculate a generic query result.

12. The query processing system of claim 11, wherein the query processing unit is further configured to reformulate the calculated generic query result into a customer specific query result based on the stored query reformulation model, and wherein the application query interface is further configured to output the customer specific query result.

13. The query processing system of claim 7, wherein the query processing unit comprises a local query processing unit or a remote query processing unit implemented on a server of a service provider, and wherein the query reformulation model is decentralized or stored in a central database of a service provider.

14. The query processing system of claim 7, wherein the application query interface comprises a user interface operable to receive a customer query input by a user of an industrial system of the industrial systems, a data interface operable to receive a customer query generated by a controller of the industrial system, or the user interface and the data interface.

15. The query processing system of claim 7, wherein the query processing system is implemented on an FPGA.

* * * * *